United States Patent
Yanagisawa et al.

(10) Patent No.: US 10,744,418 B2
(45) Date of Patent: Aug. 18, 2020

(54) MOVING OBJECT OPERATION SYSTEM, OPERATION SIGNAL TRANSMISSION SYSTEM, MOVING OBJECT OPERATION METHOD, PROGRAM, AND RECORDING MEDIUM

(71) Applicant: NEC Solution Innovators, Ltd., Koto-ku, Tokyo (JP)

(72) Inventors: Hiroaki Yanagisawa, Tokyo (JP); Koji Morishita, Tokyo (JP); Hisashi Noda, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 0 days.

(21) Appl. No.: 16/325,255

(22) PCT Filed: Mar. 16, 2017

(86) PCT No.: PCT/JP2017/010796
§ 371 (c)(1),
(2) Date: Feb. 13, 2019

(87) PCT Pub. No.: WO2018/034018
PCT Pub. Date: Feb. 22, 2018

(65) Prior Publication Data
US 2019/0184301 A1    Jun. 20, 2019

(30) Foreign Application Priority Data
Aug. 16, 2016   (JP) .................................. 2016-159729

(51) Int. Cl.
*A63H 27/00*    (2006.01)
*A63H 30/04*    (2006.01)
(Continued)

(52) U.S. Cl.
CPC ............. *A63H 27/12* (2013.01); *A63H 30/04* (2013.01); *B64C 13/20* (2013.01); *B64C 27/04* (2013.01);
(Continued)

(58) Field of Classification Search
CPC ........ A63H 27/00; A63H 27/12; A63H 30/00; A63H 30/04; B64C 39/024; B64C 2201/021; B64C 2201/024
(Continued)

(56) References Cited

U.S. PATENT DOCUMENTS

| | | | | |
|---|---|---|---|---|
| 5,628,620 A | * | 5/1997 | Arlton | A63H 27/12 416/103 |
| 7,407,424 B2 | * | 8/2008 | Choi | G01S 5/26 446/175 |

(Continued)

FOREIGN PATENT DOCUMENTS

| | | |
|---|---|---|
| JP | 53-85647 A | 7/1978 |
| JP | 2-204198 A | 8/1990 |

(Continued)

OTHER PUBLICATIONS

Rudnick et al., "Scalable Autonomy Concept for Reconnaissance UAVs on the Basis of and HTN Agent Architecture", 2016 International Conference on Unmanned Aircraft Systems (ICUAS), Jun. 7-10, 2016, pp. 40-46 (total 7 pages).

(Continued)

*Primary Examiner* — Kien T Nguyen (57) ABSTRACT

The present invention provides a new system that allows a safer operation of a moving object. The present invention provides a moving object operation system (1) including: a (Continued)

moving object (11); a plurality of operation signal transmitters (12A, 12B) for the moving object; and a synchronization unit (13). The moving object (11) includes: a signal receipt unit (111) that receives operation signals from the operation signal transmitters (12A, 12B). The operation signal transmitters (12A, 12B) include signal transmission units (121A, 121B) that transmit the operation signals to the moving object (11), respectively. The synchronization unit (13) is a unit that synchronizes the operation signal transmitters (12A, 12B).

18 Claims, 7 Drawing Sheets

(51) Int. Cl.
| | | |
|---|---|---|
| *B64C 13/20* | (2006.01) | |
| *B64C 39/02* | (2006.01) | |
| *G09B 9/48* | (2006.01) | |
| *H04Q 9/00* | (2006.01) | |
| *H04M 1/00* | (2006.01) | |
| *B64C 27/08* | (2006.01) | |
| *G05D 1/00* | (2006.01) | |
| *B64C 27/04* | (2006.01) | |

(52) U.S. Cl.
CPC .............. *B64C 27/08* (2013.01); *B64C 39/02* (2013.01); *G05D 1/00* (2013.01); *G09B 9/48* (2013.01); *H04M 1/00* (2013.01); *H04Q 9/00* (2013.01)

(58) Field of Classification Search
USPC .............................................. 446/34–36, 484
See application file for complete search history.

(56) References Cited

U.S. PATENT DOCUMENTS

| | | | |
|---|---|---|---|
| 8,561,937 B2 * | 10/2013 | Goodarzi .............. | B64C 39/024 244/17.19 |
| 8,639,400 B1 * | 1/2014 | Wong ..................... | A63H 30/04 244/17.13 |
| 2010/0210169 A1 * | 8/2010 | Rohr ...................... | A63H 30/04 446/36 |
| 2011/0103429 A1 | 5/2011 | Tanaka et al. | |
| 2011/0221692 A1 | 9/2011 | Seydoux et al. | |

FOREIGN PATENT DOCUMENTS

| | | |
|---|---|---|
| JP | 3-126324 A | 5/1991 |
| JP | 10-108984 A | 4/1998 |
| JP | 2011-72377 A | 4/2011 |
| JP | 2011-189929 A | 9/2011 |
| WO | 2016/100601 A2 | 6/2016 |

OTHER PUBLICATIONS

International Search Report for PCT/JP2017/010796 dated Jun. 13, 2017.
Written Opinion for PCT/JP2017/010796 dated Jun. 13, 2017.

* cited by examiner

MOVING OBJECT OPERATION SYSTEM, OPERATION SIGNAL TRANSMISSION SYSTEM, MOVING OBJECT OPERATION METHOD, PROGRAM, AND RECORDING MEDIUM

This application is a National Stage Entry of PCT/JP2017/010796 filed on Mar. 16, 2017, which claims priority from Japanese Patent Application 2016-159729 filed on Aug. 16, 2016, the contents of all of which are incorporated herein by reference, in their entirety.

TECHNICAL FIELD

The present invention relates to a moving object operation system, an operation signal transmission system, a moving object operation method, a program, and a recording medium.

BACKGROUND ART

Among unmanned flight vehicles operated by remote control, drones have been attempted to be used for various services in recent years. In addition, drones have become easy to obtain as household toys. A so-called proportional type controller is used for the operation of the drone, and the motor of the drone is controlled by moving two sticks mounted on the controller, thereby controlling the movement of the drone (Non Patent Literature 1). However, the operation of the drone is extremely difficult. In fact, sufficient practice must be carried out in order to safely operate the drone.

CITATION LIST

Non Patent Literature

Non Patent Literature 1: "Scalable Autonomy Concept for Reconnaissance UAVs on the Basis of an HTN Agent Architecture", 2016 International Conference on Unmanned Aircraft Systems (ICUAS), Jun. 7-10, 2016.

SUMMARY OF INVENTION

Technical Problem

Hence, the present invention is intended to provide a new system that allows a safer operation of an unmanned flight vehicle such as a drone operated by remote control.

Solution to Problem

In order to achieve the above object, the present invention provides a moving object operation system including: a moving object; a plurality of operation signal transmitters for the moving object; and a synchronization unit. The moving object includes: a signal receipt unit that receives operation signals from the operation signal transmitters. Each of the operation signal transmitters includes: a signal transmission unit that transmits the operation signal to the moving object. The synchronization unit is a unit that synchronizes the operation signal transmitters.

The present invention also provides an operation signal transmission system for a moving object, including: a plurality of operation signal transmitters that transmits operation signals to a moving object; and a synchronization unit. The synchronization unit is a unit that synchronizes the operation signal transmitters.

The present invention also provides a moving object operation method using a moving object and the operation signal transmission system according to the present invention, including the steps of: synchronizing a plurality of operation signal transmitters by the system; transmitting an operation signal to the moving object by the system; and receiving the transmitted operation signal by the moving object.

The present invention also provides a program that can execute the moving object operation method of the present invention on a computer.

The present invention also provides a computer-readable recording medium recorded with the program of the present invention.

Advantageous Effects of Invention

According to the present invention, a safer operation of a moving object can be achieved.

DESCRIPTION OF EMBODIMENTS

In the moving object operation system, the operation signal transmission system, and the moving object operation method of the present invention, for example, the synchronization unit is a server connectable to the operation signal transmitters via a communication network.

In the moving object operation system, the operation signal transmission system, and the moving object operation method of the present invention, for example, each of the operation signal transmitters includes the synchronization unit, and the operation signal transmitters are synchronized by the respective synchronization units via a communication network.

In the moving object operation system and the operation signal transmission system of the present invention, for example, an operation signal transmitter that exercises an operation function to the moving object is switchable among the operation signal transmitters.

The moving object operation method of the present invention further includes the step of: switching an operasignal transmitter that exercises an operation function to the moving object among the operation signal transmitters, for example.

In the moving object operation system and the operation signal transmission system of the present invention, for example, priorities are assigned to operation functions of the operation signal transmitters to the moving object, and the synchronization unit synchronizes, to an operation signal transmitter having relatively higher priority, rest of operation signal transmitters among the operation signal transmitters each exercising the operation function.

In the moving object operation method of the present invention, for example, priorities are assigned to operation functions of the operation signal transmitters to the moving object, and, to an operation signal transmitter having relatively higher priority, rest of operation signal transmitters among the operation signal transmitters each exercising the operation function are synchronized in the synchronization step.

In the moving object operation system and the operation signal transmission system of the present invention, for example, each of the operation signal transmitters has an operable area set in advance, and an operation signal transmitter that exercises an operation function to the moving object is switchable between two operation signal transmitters, operable areas of which are partially overlapped, among the operation signal transmitters when the moving object is present in an overlap area.

In the moving object operation method of the present invention, for example, each of the operation signal transmitters has an operable area set in advance, and an operation signal transmitter that exercises an operation function to the moving object is switchable between two operation signal transmitters, operable areas of which are overlapped, among the operation signal transmitters when the moving object is present in an overlap area in the switching step.

In the moving object operation system and the operation signal transmission system of the present invention, for example, at least one operation signal transmitter includes an operation support information transmission unit that transmits operation support information to at least one other operation signal transmitter, and the at least one other operation signal transmitter includes an operation support information receipt unit that receives operation support information from the at least one operation signal transmitter.

The moving object operation method of the present invention further includes the steps of: transmitting operation support information from at least one operation signal transmitter to at least one other operation signal transmitter; and receiving the operation support information from the at least one operation signal transmitter by the at least one other operation signal transmitter, for example.

In the moving object operation system, the operation signal transmission system, and the moving object operation method of the present invention, for example, each of the operation signal transmitters includes a display unit.

In the moving object operation system, the operation signal transmission system, and the moving object operation method of the present invention, for example, the operation signal transmitter is a smartphone or a tablet.

In the moving object operation system, the operation signal transmission system, and the moving object operation method of the present invention, for example, the moving object is a flight vehicle.

In the moving object operation system, the operation signal transmission system, and the moving object operation method of the present invention, for example, the flight vehicle is a drone.

In the moving object operation system, the operation signal transmission system, and the moving object operation method of the present invention, for example, the moving object includes an image information acquisition unit.

The example embodiments of the present invention are described below with reference to the drawings. It is to be noted, however, that the present invention is by no means limited or restricted by the following example embodiments. In the following drawings, identical parts are indicated with identical reference signs. Regarding the descriptions of the example embodiments, reference can be made to one another unless otherwise stated. Furthermore, the configurations of the example embodiments can be combined unless otherwise stated.

First Example Embodiment

The first example embodiment relates to a moving object operation system, an operation signal transmission system, and a moving object operation method of the present invention.

Figure 1:
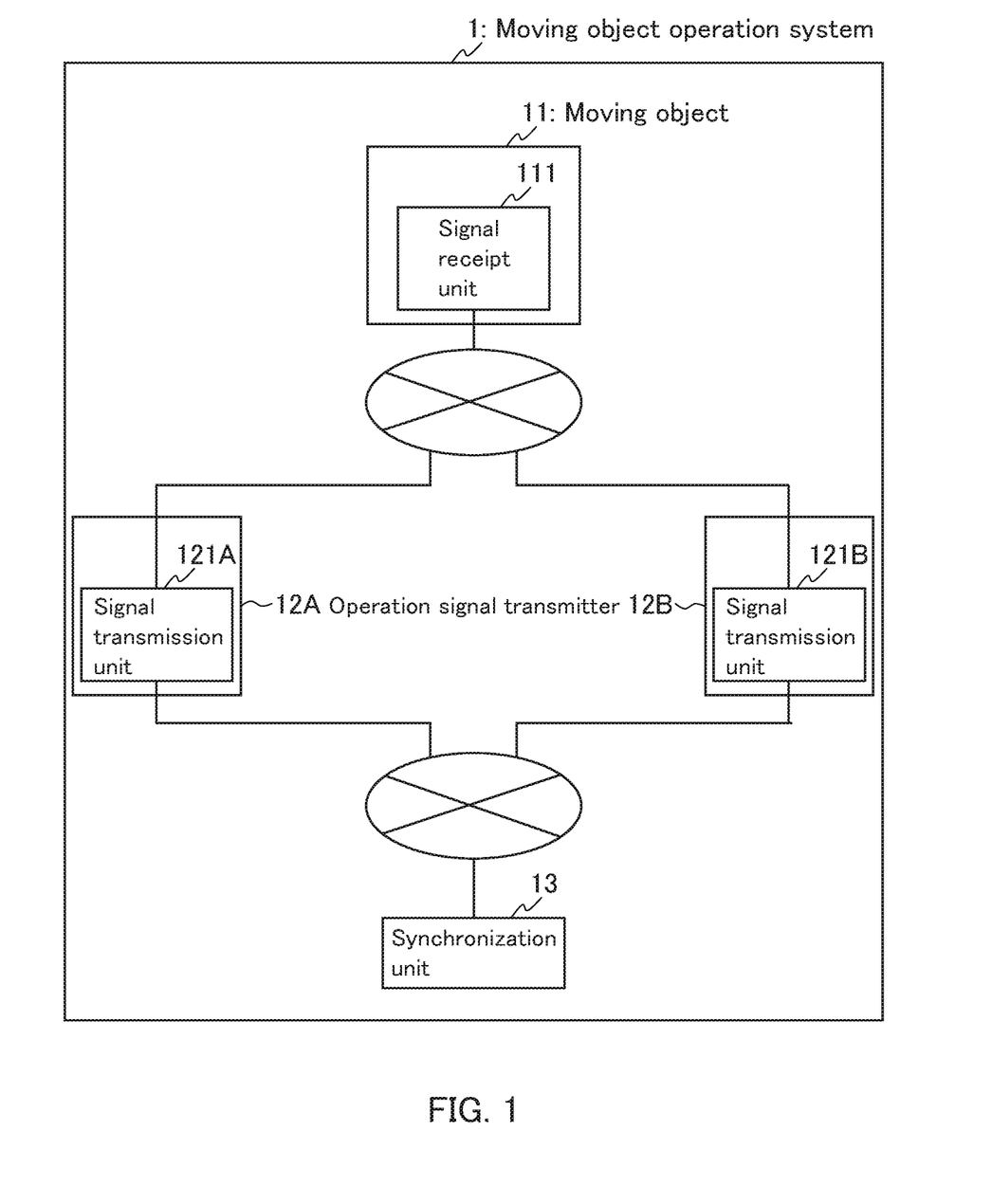
FIG. 1 is a block diagram showing an example of the moving object operation system according to the first example embodiment of the present invention.

FIG. 1 shows a block diagram of a moving object operation system according to the present example embodiment. As shown in FIG. 1, the moving object operation system 1 of the present example embodiment includes a moving object 11, two operation signal transmitters 12A and 12B, and a synchronization unit 13. The moving object 11 and two operation signal transmitters 12A and 12B are connectable via a communication network. The operation signal transmitters 12A and 12B and the synchronization unit 13 are connectable via a communication network. The communication network may be wireless or wired, and is preferably wireless. The moving object operation system shown in FIG. 1 includes two operation signal transmitters. The moving object operation system however may include three or more operation signal transmitters.

The moving object 11 is, for example, an unmanned flight vehicle operated by remote control, and may be a flight vehicle. The flight vehicle may be, for example, an unmanned flight vehicle with a rotary wing such as a helicopter. The helicopter may be, for example, a multicopter such as a quadricoptoer. Specifically, the multicopter such as a quadricoptoer or the like may be, for example, a so-called drone. Examples of the flight vehicle besides the drone include radio operated flight vehicles such as a balloon, an airship, a variable-wing aircraft (VTOL), a fixed-wing aircraft, and a multiple-wing aircraft (e.g., an Amazon Air). The moving object may be, for example, a remote vehicle such as a throttle-automobile. The moving object 11 includes a signal receipt unit 111. The signal receipt unit 111 is, for example, a central processing unit (CPU) or the like.

Examples of the operation signal transmitters 12A and 12B include smartphones, tablets, and so-called proportional type controllers that operate the moving object 11 by moving two sticks. The operation signal transmitters 12A and 12B include signal transmission units 121A and 121B, respectively. The signal transmission units 121A and the signal 121B may be installed, for example, in a data processing unit (data processing device), which is hardware, or may be software or hardware in which the software is installed. The data processing unit may include a CPU or the like.

The synchronization unit 13 is a unit that synchronizes the operation signal transmitters 12A and 12B. In the present invention, examples of the synchronization include operational synchronization of matching the movements of the operation signal transmitters and visual synchronization of matching the indications displayed on the display screens of the operation signal transmitters if they have display screens. The synchronization unit 13 may be any unit as long as it can synchronize the operation signal transmitters, and may be, for example, a server connectable to the operation signal transmitters via the communication network. The synchronization unit 13 may be provided independently of the operation signal transmitters, for example, as shown in FIG. 1. Furthermore, for example, each of the operation signal transmitters may include a synchronization unit, and the operation signal transmitters may be synchronized by the respective synchronization units via a communication network.

In the moving object operation system 1 of the present example embodiment, the operation signal transmitters 12A and 12B and synchronization unit 13, except for the moving object 11, correspond to the operation signal transmission system of the present invention, and the same applies in the second and third example embodiments.

An example of the moving object operation method of the present example embodiment is described below with reference to the case in which the moving object 11 is a drone, the operation signal transmitters 12A and 12B are smartphones, and the synchronization unit 13 is a server as an example using FIG. 2. This is an example of the case in which a trainer provides guidance on a trainee the operation method of the drone 11.

In the moving object operation method of the present example embodiment, priorities are assigned to the operation functions of the smartphones 12A and 12B to the drones. Specifically, the smartphone 12A has higher priority for the operation function to the drone 11, the smartphone 12B has lower priority for the operation function to the drone 11, and the server 13 synchronizes the smartphone 12B to the smartphone 12A having relatively higher priority. This makes it possible to switch the smartphone that exercises the operation function to the drone 11 between the smartphone 12A of the trainer and the smartphone 12B of the trainee. The flowchart of the moving object operation method of the present example embodiment is described below in detail.

First, the smartphones 12A and 12B are synchronized by the server 13. This synchronization step is continuously performed in the moving object operation method of the present invention.

Figure 2:
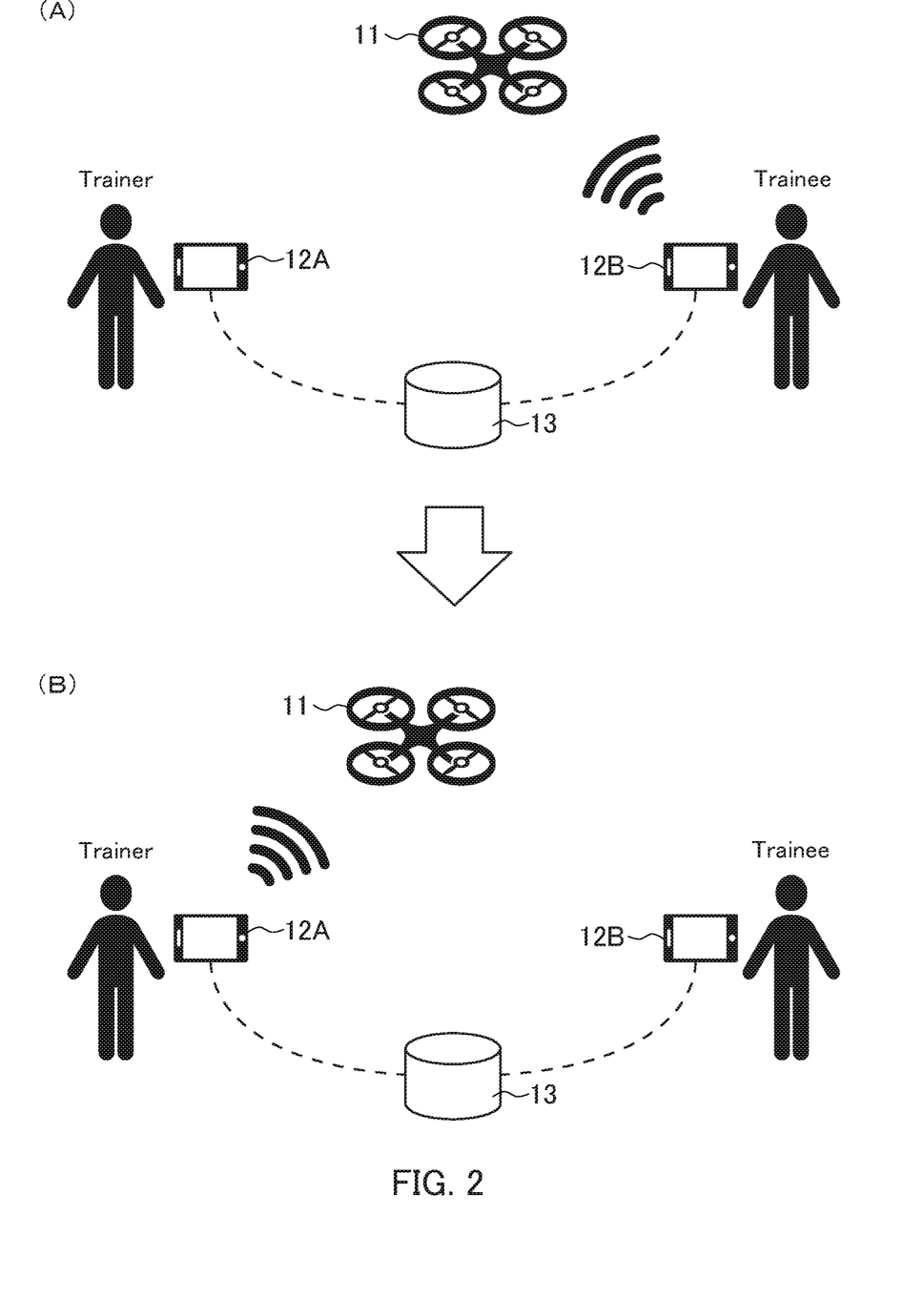
FIG. 2 is a schematic view showing an example of the moving object operation method according the first example embodiment of the present invention.

Next, as shown in (A) of FIG. 2, the trainee transmits an operation signal from the smartphone 12B to the drone 11. The drone 11 then receives the operation signal from the smartphone 12B. The movement of the drone 11 is controlled according to the operation signal.

In this situation, for example, when the trainer feels a danger that the drone 11 may hit a passerby if the trainee continues to operate the drone 11, the trainer transmits an operation signal from the smartphone 12A to the drone 11 as shown in (B) of FIG. 2. As described above, the smartphone 12A of the trainer is ranked high in priority of the operation function to the drone 11 as compared to the smartphone 12B of the trainee, and the server 13 synchronizes the smartphone 12B to the smartphone 12A having relatively higher priority. Thus, while the operation signal from the smartphone 12B is transmitted to the drone 11 in a state where the operation signal from the smartphone 12A is not transmitted, the operation signal from the smartphone 12B is not transmitted to the drone 11 in a state where the operation signal from the smartphone 12A is transmitted and only the operation signal from the smartphone 12A of the trainer is transmitted to the drone 11. The drone 11 then receives the operation signal from smartphone 12A of the trainer. The movement of the drone 11 is controlled according to the operation signal from the trainer.

As described above, according to the present example, the smartphone that exercises the operation function to the drone 11 is switchable between the smartphone 12A of the trainer and the smartphone 12B of the trainee, so that the trainer can support the trainee to operate the drone 11 safely.

Another example of the moving object operation method of the present example embodiment is described below with reference to the case in which the moving object 11 is a drone, the operation signal transmitters 12A and 12B are smartphones, and the synchronization unit 13 is a server as an example using FIG. 3. This is an example in which the operation of the drone 11 is switched between the operators A and B with an obstacle 20 interposed therebetween.

Figure 4:
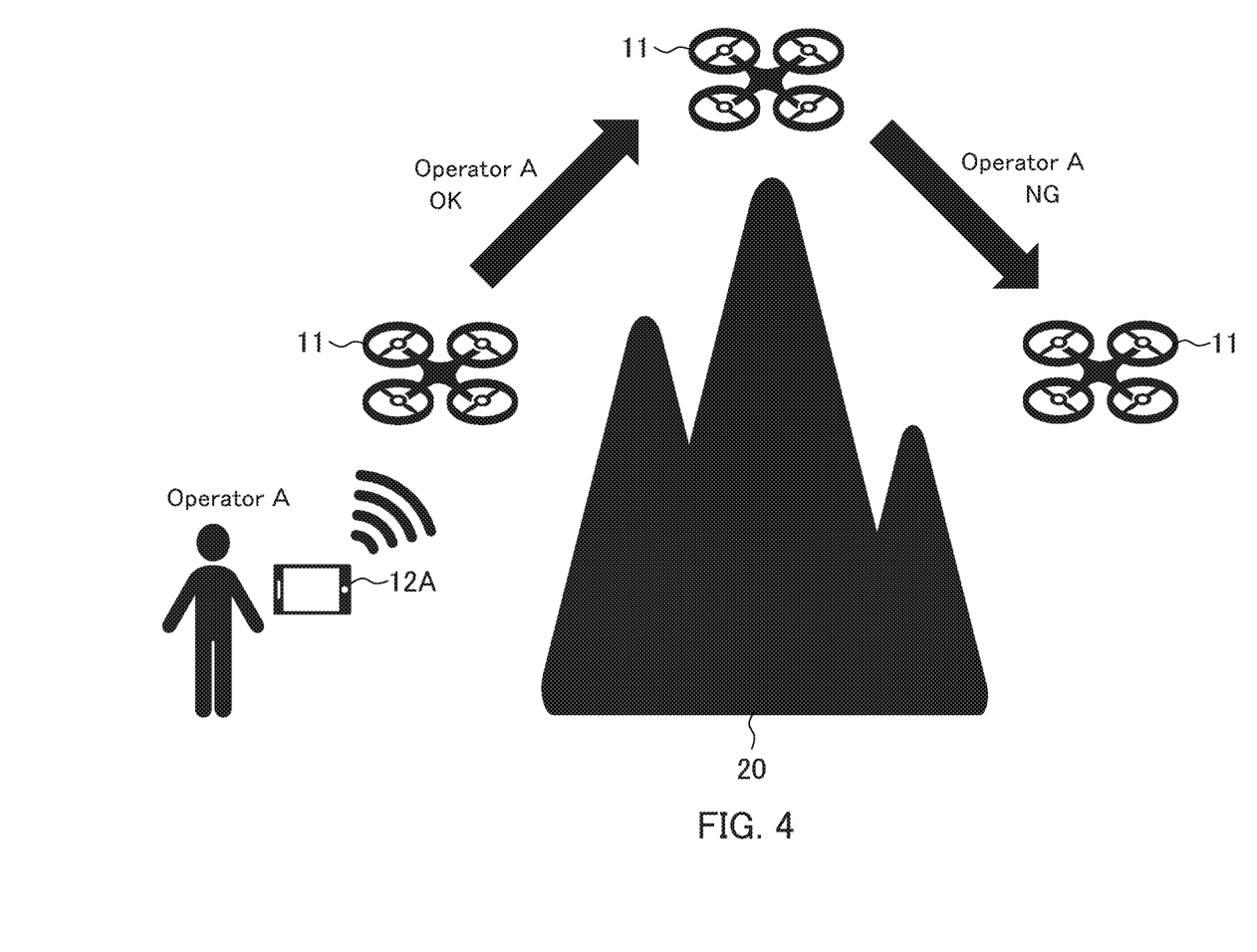
FIG. 4 is a schematic view showing an example of a common moving object operation method.

As shown in FIG. 4, when only one smartphone (operation signal transmitter) 12A is used for one drone 11, the operator A can operate the drone 11 safely as long as the drone 11 is in front of the obstacle 20 where the operator A can visually recognize the drone 11. However, when the drone 11 is behind the obstacle 20 where the operator A cannot visually recognize the drone 11 because of the obstacle 20, the operation may be dangerous and there is a case that such an operation is prohibited by laws and regulations.

On the other hand, according to the moving object operation method of the present example embodiment, the operator B takes over the operation of the drone 11 from the operator A, thereby achieving a safe operation of the drone 11. In the moving object operation method of the present example embodiment, each of the smartphones 12A and 12B has an operable area set in advance. Specifically, the operable area of the smartphone 12A is set to the left of the obstacle 20 where the operator A can visually recognize the drone 11, the operable area of the smartphone 12B is set to the right of the obstacle 20 where the operator B can visually recognize the drone 11, and the operable areas of both are partially overlapped. Thereby, the smartphone that exercises the operation function to the moving object is switchable between the smartphone 12A of the operator A and the smartphone 12B of the operator B when the moving object is present in the overlap area. The flowchart of the moving object operation method of the present example embodiment is described below in detail.

Also in the moving object operation method of the present example embodiment, first, the smartphones 12A and 12B are synchronized by the server 13. As described above, this synchronization step is continuously performed in the moving object operation method of the present invention.

Figure 3:
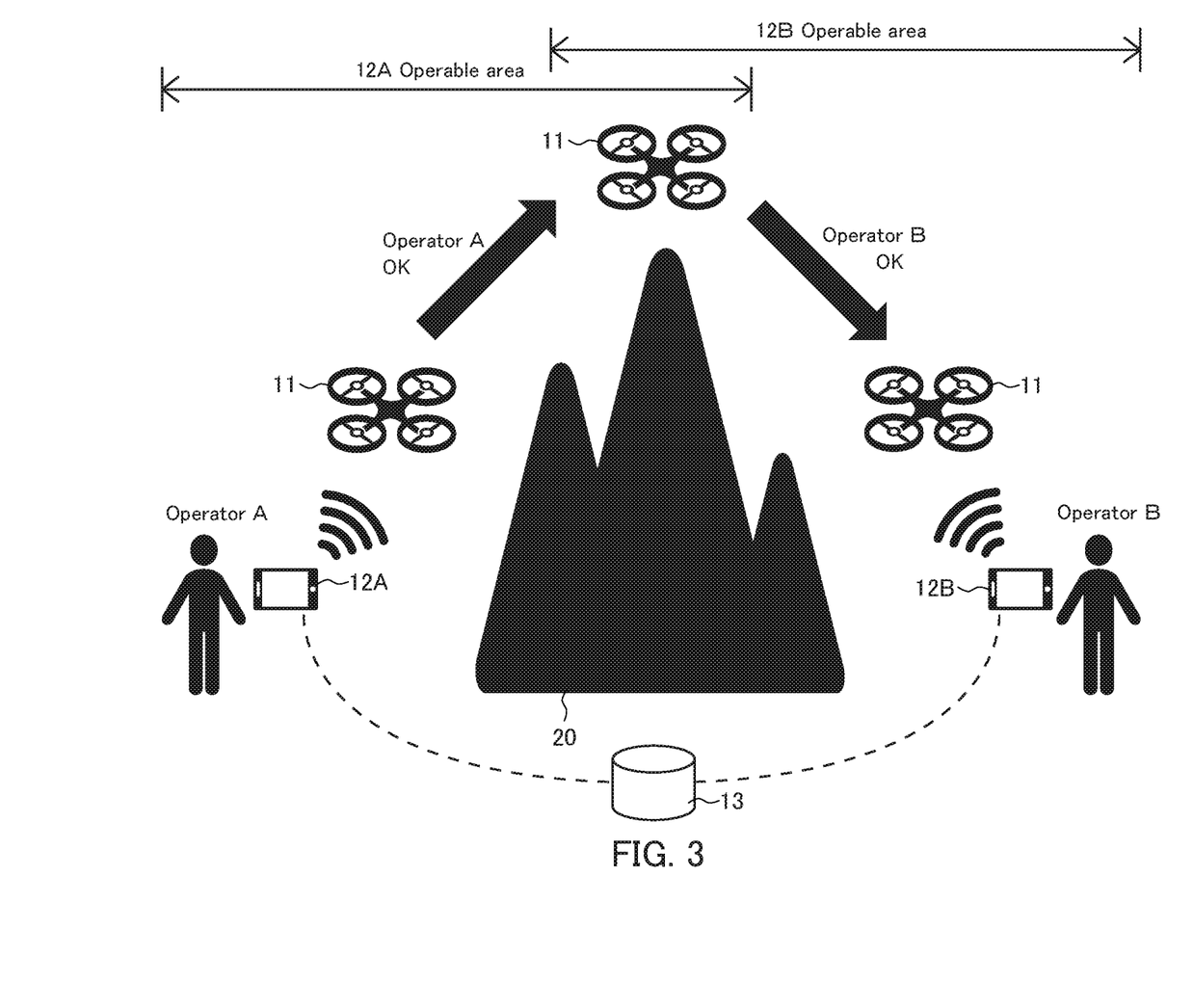
FIG. 3 is a schematic view showing another example of the moving object operation method according the first example embodiment of the present invention.

Next, as shown in FIG. 3, the operator A transmits an operation signal from the smartphone 12A to the drone 11. The drone 11 then receives the operation signal from the smartphone 12A. The movement of the drone 11 is controlled according to the operation signal.

Next, when the drone 11 enters the overlap area of the operable area of the smartphone 12A and the operable area of the smartphone 12B, and when the operator B visually recognizes the drone 11, the operator B transmits an operation signal from the smartphone 12B to the drone 11. The drone 11 then receives the operation signal from the smartphone 12B. The movement of the drone 11 is controlled according to the operation signal. At this time, for example, an alert asking whether or not to hand over the operation of the drone 11 to the operator B may be displayed on the smartphone 12A of the operator A, and an alert asking whether or not to take over the operation of the drone 11 from the operator A may be displayed on the smartphone 12B of the operator B. In this case, when the operator A selects the handover of the operation of the drone 11 and the operator B selects the takeover of the operation of the drone 11, the smartphone that exercises the operation function to the drone 11 is switched from the smartphone 12A to the smartphone 12B. On the other hand, in other cases, i.e. when the operator A does not select the handover of the operation of the drone 11, when the operator B does not select the takeover of the operation of the drone 11, or when one or both of the operator A and the operator B do not select either, the drone 11 hovers in the overlap area.

According to this example, the operator B takes over the operation of the drone 11 from the operator A, so that the drone 11 can be operated safely even in an area where the operator A cannot visually recognize the drone 11. As a result, the flight area of the drone 11 can be expanded safely.

Second Example Embodiment

The second example embodiment relates to an aspect in which the moving object operation system of the present invention further includes an operation support information transmission unit and an operation support information receipt unit, and the moving object operation method further includes the steps of transmitting operation support information and receiving operation support information. Regarding the present example embodiment, reference can be made to the description of the first example embodiment.

Figure 5:
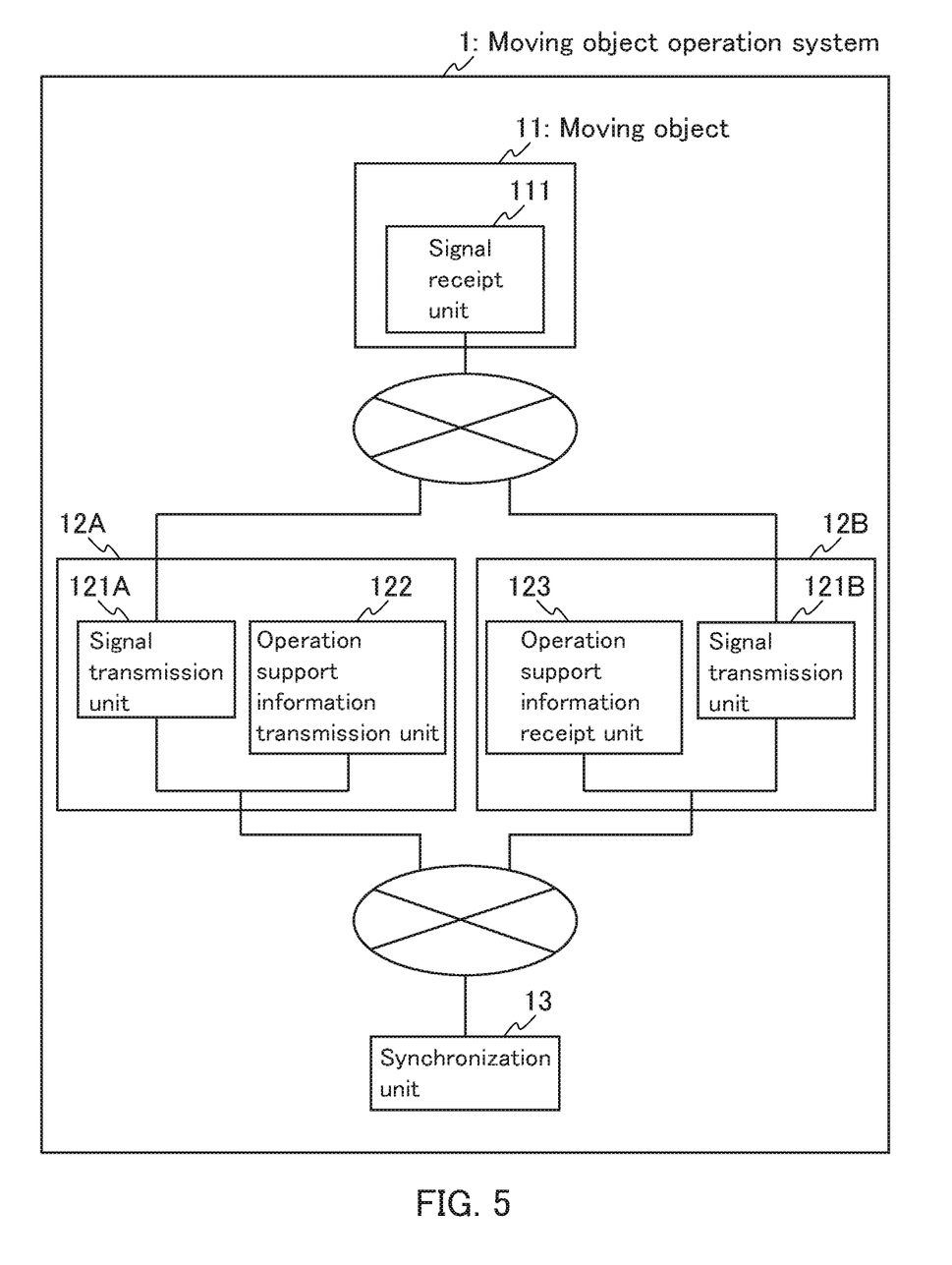
FIG. 5 is a block diagram showing an example of the moving object operation system according to the second example embodiment of the present invention.

FIG. 5 is a block diagram showing the moving object operation system according to the present example embodiment. As shown in FIG. 5, in the moving object operation system 1 of the present example embodiment, the operation signal transmitter 12A further includes an operation support information transmission unit 122 and the operation signal transmitter 12B further includes an operation support information receipt unit 123. The operation support information transmission unit 122 and the operation support information receipt unit 123 are connectable via the communication network. However, FIG. 5 is merely for illustrative purposes, and in the moving object operation system 1 of the present example embodiment, each operation signal transmitter may include both of the operation support information transmission unit 122 and the operation support information receipt unit 123.

The operation support information transmission unit 122 transmits operation support information for the operation signal transmitter 12B. The operation support information receipt unit 123 receives the operation support information from the operation signal transmitter 12A.

Examples of the operation support information include information denoting the instructions of the directions of the moving object 11 movement such as "right", "left", "up", and "down"; information denoting the instructions of stopping of the moving object 11 such as "watch out" and "stop"; information denoting the instructions of the degree of the moving object 11 movement such as "less" and "more"; and information denoting the instructions of the speed of the moving object 11 movement such as "faster" and "slower". Examples of the operation support information transmission unit 122 and the operation support information receipt unit 123 include units that can transmit and receive the operation support information as sound information, image information, and the like.

An example of the moving object operation method of the present example embodiment is described below with reference to the case in which the moving object 11 is a drone, the operation signal transmitters 12A and 12B are smartphones, and the synchronization unit 13 is a server as an example using FIG. 6. This is an example of the case in which a trainer provides guidance on a trainee the operation method of the drone 11.

First, the smartphones 12A and 12B are synchronized by the server 13. As described above, this synchronization step is continuously performed in the moving object operation method of the present invention.

Figure 6:
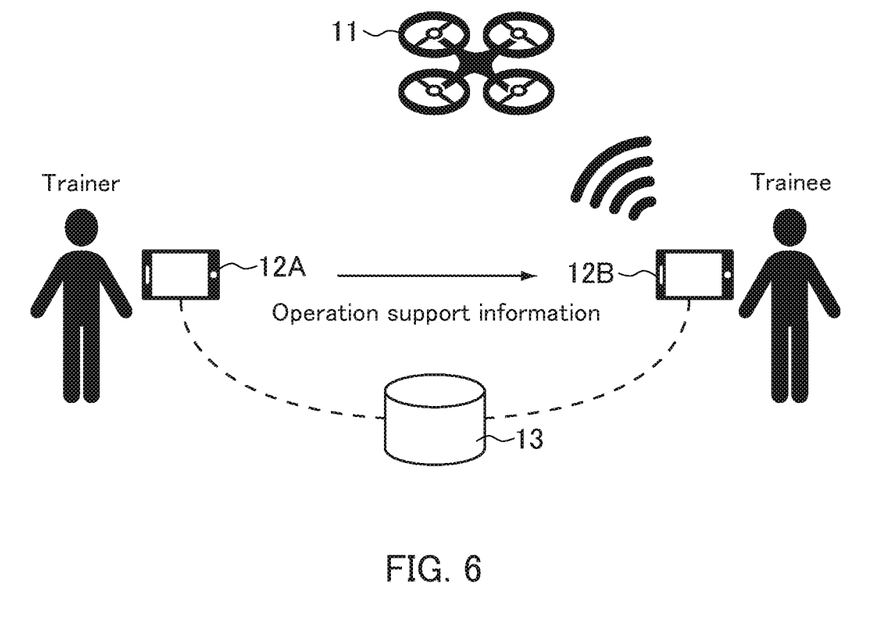
FIG. 6 is a schematic view showing an example of the moving object operation method according to the second example embodiment of the present invention.

Next, as shown in FIG. 6, the trainee transmits an operation signal from the smartphone 12B to the drone 11. The drone 11 then receives the operation signal from the smartphone 12B. The movement of the drone 11 is controlled according to the operation signal.

In this situation, for example, when the trainer feels a danger that the drone 11 may hit a passerby if the trainee continues to operate the drone 11, the trainer transmits operation support information from the smartphone 12A to the smartphone 12B.

According to this example, in addition to the effect obtained in the example shown in FIG. 2, the trainer can present an operation suggestion to the trainee as a preliminary stage of the switching of the smartphone that exercises the operation function to the drone 11, so that the drone 11 can be operated safely.

Third Example Embodiment

The third example embodiment relates to an aspect in which the moving object operation system of the present invention further includes an image information acquisition unit and a display unit. Regarding the present example embodiment, reference can be made to the descriptions of the first example embodiment.

Figure 7:
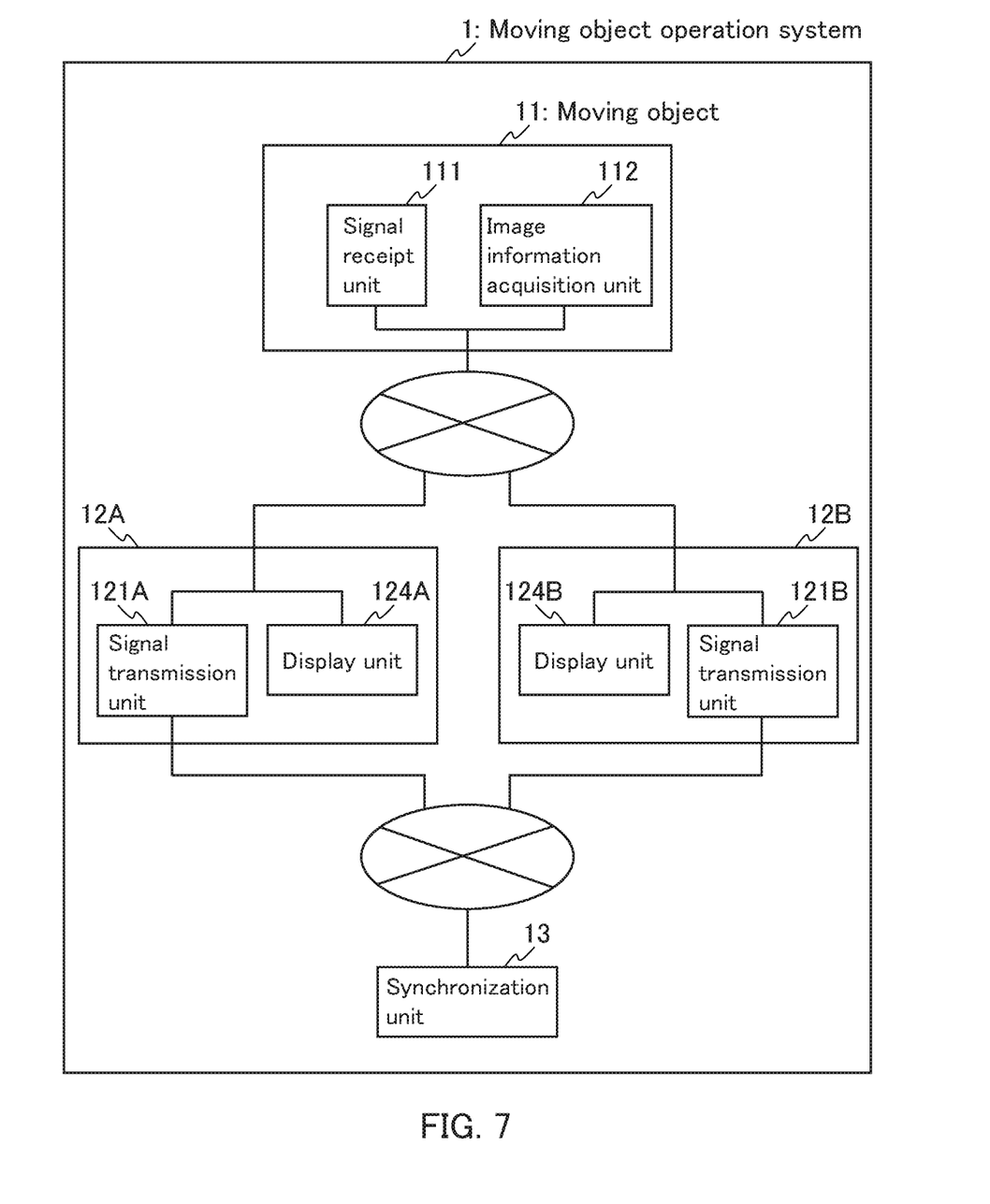
FIG. 7 is a block diagram showing an example of the moving object operation system according to the third example embodiment of the present invention.

FIG. 7 shows a block diagram of the moving object operation system according to the present example embodiment. As shown in FIG. 7, in the moving object operation system 1 of the present example embodiment, the moving object 11 further includes an image information acquisition unit 112, and the operation signal transmitters 12A and 12B further include displays 124A and 124B, respectively. The image information acquisition unit 112 is connectable to the operation signal transmitters 12A and 12B via the communication network. A display unit 124A is connectable to the moving object 11 and the operation signal transmitter 12B via the communication network. A display unit 124B is connectable to the moving object 11 and the operation signal transmitter 12A via the communication network.

The image information acquisition unit 112 acquires image information. The image information is, for example, a moving image (video). The image information acquisition unit 112 may be, for example, a camera, and is mounted on the main body of the moving object 11. The camera may be, for example, a camera for shooting one direction, which may be rotatable by 360°. The camera is mounted on the moving object 11 in the state of shooting the front direction, for example. Alternatively, the camera may be, for example, a 360° camera for shooting an omnidirectional image at once. In the case of a 360° camera, for example, an omnidirectional image can be acquired without rotating the camera.

The display units 124A and 124B display the image information received from the moving object 11. The display units 124A and 124B may be, for example, monitors for outputting images, and specific examples thereof include various image display apparatuses such as liquid crystal displays (LCDs), cathode ray tube (CRT) displays, and the like.

According to the present example embodiment, in addition to the effects obtained by the first and second example embodiments, the image information obtained by the image information acquisition unit 112 of the moving object 11 can be displayed on the display units 124A and 124B of the operation signal transmitters 12A and 12B.

Fourth Example Embodiment

The program according to the present example embodiment is a program that can execute the above-described moving object operation method on a computer. The program of the present example embodiment may be recorded on, for example, a computer-readable recording medium. The recording medium is not particularly limited, and examples thereof include random access memories (RAMs), read-only memories (ROMs), hard disks (HDs), optical disks, and Floppy® disks (FDs).

While the present invention has been described above with reference to illustrative example embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2016-159729 filed on Aug. 16, 2016. The entire subject matter of the Japanese Patent Application is incorporated herein by reference.

INDUSTRIAL APPLICABILITY

According to the present invention, a safer operation of a moving object can be achieved.

REFERENCE SIGNS LIST

1 moving object operation system
11 moving object
12A, 12B operation signal transmitter
13 synchronization unit
20 obstacle
111 signal receipt unit
112 image-information acquisition unit
121A, 121B signal transmission unit
122 operation support information transmission unit
123 operation support information receipt unit
124A, 124B display unit

What is claimed is:

1. A moving object operation system comprising:
a moving object;
a plurality of operation signal transmitters for the moving object; and
a synchronization unit, wherein
the moving object comprises:
a signal receipt unit that receives operation signals from the operation signal transmitters,
each of the operation signal transmitters comprises:
a signal transmission unit that transmits the operation signal to the moving object, and the synchronization unit is a unit that synchronizes the operation signal transmitters, wherein
at least one operation signal transmitter comprises an operation support information transmission unit that transmits operation support information to at least one other operation signal transmitter, and
the at least one other operation signal transmitter comprises an operation support information receipt unit that receives operation support information from the at least one operation signal transmitter.

2. The moving object operation system according to claim 1, wherein
the synchronization unit is a server connectable to the operation signal transmitters via a communication network.

3. The moving object operation system according to claim 1, wherein
each of the operation signal transmitters comprises the synchronization unit, and
the operation signal transmitters are synchronized by the respective synchronization units via a communication network.

4. The moving object operation system according to claim 3, wherein
each of the operation signal transmitters has an operable area set in advance, and
an operation signal transmitter that exercises an operation function to the moving object is switchable between two operation signal transmitters, operable areas of which are partially overlapped, among the operation signal transmitters when the moving object is present in an overlap area.

5. The moving object operation system according claim 1, wherein
an operation signal transmitter that exercises an operation function to the moving object is switchable among the operation signal transmitters.

6. The moving object operation system according to claim 1, wherein
priorities are assigned to operation functions of the operation signal transmitters to the moving object, and
the synchronization unit synchronizes, to an operation signal transmitter having relatively higher priority, rest of operation signal transmitters among the operation signal transmitters each exercising the operation function.

7. The moving object operation system according to claim 1, wherein
each of the operation signal transmitters comprises a display unit.

8. The moving object operation system according to claim 1, wherein
the moving object is a flight vehicle.

9. The moving object operation system according to claim 1, wherein
the moving object comprises an image information acquisition unit.

10. An operation signal transmission system for a moving object, comprising:
a plurality of operation signal transmitters that transmits operation signals to a moving object; and
a synchronization unit, wherein
the synchronization unit is a unit that synchronizes the operation signal transmitters,
at least one operation signal transmitter comprises an operation support information transmission unit that transmits operation support information to at least one other operation signal transmitter, and the at least one other operation signal transmitter comprises an operation support information receipt unit that receives operation support information from the at least one operation signal transmitter.

11. The operation signal transmission system according to claim 10, wherein the synchronization unit is a server connectable to the operation signal transmitters via a communication network.

12. The operation signal transmission system according to claim 10, wherein each of the operation signal transmitters comprises the synchronization unit, and the operation signal transmitters are synchronized by the respective synchronization units via a communication network.

13. The operation signal transmission system according to claim 10, wherein an operation signal transmitter that exercises an operation function to the moving object is switchable among the operation signal transmitters.

14. The operation signal transmission system according to claim 13, wherein each of the operation signal transmitters has an operable area set in advance, and an operation signal transmitter that exercises an operation function to the moving object is switchable between two operation signal transmitters, operable areas of which are overlapped, among the operation signal transmitters when the moving object is present in an overlap area.

15. The operation signal transmission system according to claim 10, wherein priorities are assigned to operation functions of the operation signal transmitters to the moving object, and the synchronization unit synchronizes, to an operation signal transmitter having relatively higher priority, rest of operation signal transmitters among the operation signal transmitters each exercising the operation function.

16. The operation signal transmission system according claim 10, wherein each of the operation signal transmitters comprises a display unit.

17. The operation signal transmission system according to claim 10, wherein the moving object comprises an image information acquisition unit.

18. A moving object operation method using a moving object and the operation signal transmission system according to claim 10, comprising:

synchronizing a plurality of operation signal transmitters by the system;

transmitting an operation signal to the moving object by the system; and receiving the transmitted operation signal by the moving object.

* * * * *